(12) United States Patent
Thompson et al.

(10) Patent No.: US 11,115,481 B2
(45) Date of Patent: *Sep. 7, 2021

(54) TRANSMISSION CONTROL OF PROTOCOL STATE EXCHANGE FOR DYNAMIC STATEFUL SERVICE INSERTION

(71) Applicant: A10 Networks, Inc., San Jose, CA (US)

(72) Inventors: Micheal Thompson, Meridian, ID (US); Martin Grimm, Snoqualmie, WA (US); Vernon Richard Groves, Duvall, WA (US); Rajkumar Jalan, Saratoga, CA (US)

(73) Assignee: A10 Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/805,881

(22) Filed: Mar. 2, 2020

(65) Prior Publication Data

US 2020/0204632 A1    Jun. 25, 2020

Related U.S. Application Data

(63) Continuation of application No. 14/825,096, filed on Aug. 12, 2015, now Pat. No. 10,581,976.

(51) Int. Cl.
*H04L 29/08* (2006.01)
*H04L 29/06* (2006.01)

(52) U.S. Cl.
CPC ......... *H04L 67/141* (2013.01); *H04L 63/10* (2013.01); *H04L 69/163* (2013.01)

(58) Field of Classification Search
None
See application file for complete search history.

(56) References Cited

U.S. PATENT DOCUMENTS

| | | | | |
|---|---|---|---|---|
| 9,432,463 | B2* | 8/2016 | Bowman | H04L 69/161 |
| 2007/0044142 | A1* | 2/2007 | Yoon | H04L 63/1458 726/3 |
| 2007/0245018 | A1* | 10/2007 | Bhola | H04L 63/102 709/225 |
| 2008/0120364 | A1* | 5/2008 | Chari | H04L 67/2804 709/203 |
| 2010/0250731 | A1* | 9/2010 | Xiao | H04L 63/00 709/224 |

(Continued)

*Primary Examiner* — Aaron N Strange
*Assistant Examiner* — Mohammad Yousuf A. Mian
(74) *Attorney, Agent, or Firm* — Keith Kline; The Kline Law Firm PC

(57) ABSTRACT

Provided are methods and systems for a Transmission Control Protocol (TCP) state handoff of a data traffic flow. A method for a TCP state handoff of a data traffic flow comprises determining a TCP state at predetermined times by a state machine unit. The TCP state includes data concerning a session between a client and a server. The TCP state for the predetermined times is stored to a database. A request to apply a predetermined policy to the session is received by a transaction processing unit and, in response to the request, a session request associated with the session between the client and the server is sent to an access control unit. The session request is processed by the access control unit based on the TCP state and according to the predetermined policy.

20 Claims, 5 Drawing Sheets

(56) References Cited

U.S. PATENT DOCUMENTS

| | | | |
|---|---|---|---|
| 2011/0107116 A1* | 5/2011 | Diab | ........................ H04L 12/12 |
| | | | 713/300 |
| 2013/0125230 A1* | 5/2013 | Koponen | ................ H04L 45/64 |
| | | | 726/13 |
| 2014/0280470 A1* | 9/2014 | Calo | ..................... H04L 67/142 |
| | | | 709/203 |

* cited by examiner

TRANSMISSION CONTROL OF PROTOCOL STATE EXCHANGE FOR DYNAMIC STATEFUL SERVICE INSERTION

CROSS-REFERENCE TO RELATED APPLICATIONS

The present application is a continuation of, and claims the priority benefit of, U.S. patent application Ser. No. 14/825,096 filed on Aug. 12, 2015, entitled "TRANSMISSION CONTROL OF PROTOCOL STATE EXCHANGE FOR DYNAMIC STATEFUL SERVICE INSERTION," now issued as U.S. Pat. No. 10,581,976, on Mar. 3, 2020, the disclosure of which is incorporated herein by reference in its entirety for all purposes.

TECHNICAL FIELD

This disclosure relates generally to data processing and, more particularly, to transmission of control protocol (TCP) state exchange for dynamic stateful service insertion.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A stateful service is a service in which subsequent requests to the service depend on the outcome of the first request. The service can keep track of requests made earlier and may need more recent requests to establish a session. Thus, a state of a session between a client and a server may need to be persisted to a database. The stateful service may be exemplified by a call for an application programmable interface authentication. In this example, a user sends credentials to the service and the service provides the user with a token or save a session. Subsequent requests from the user may include the token so that the service can check the status of the session that was created with the first request. Thus, a subsequent request depends on the outcome of the first request.

A stateful service insertion is an insertion of an external stateful service into a data traffic flow. In case of non-transparent stateful service insertion, the data packets are redirected to a service, such as a web proxy, which requires the data packet to be addressed to the service. In case of a transparent stateful service insertion, the data packets are redirected to a service, such as a firewall, which does not require the data packet to be specifically addressed to the service.

The stateful service insertion is typically performed using a source network address. However, conventional TCP state exchange techniques do not allow providing transferring connection states for real-time traffic flow. As a result, stateful service insertion cannot be implemented using a data traffic endpoint. Furthermore, even though there are some methods for TCP state transfers for the cases where two nodes are used, these methods are ineffective for a greater number of nodes.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for a TCP state handoff of a data traffic flow. Specifically, a system for a TCP state handoff of a data traffic flow may comprise a state machine unit, a transaction processing unit, and an access control unit. The state machine unit may be operable to determine a TCP state at predetermined times. The TCP state may include data concerning a session between a client and a server. The transaction processing unit may be operable to store the TCP state for the predetermined times to a database, receive a request to apply a predetermined policy to the session, and based on the request, send a session request associated with the session between the client and the server to the access control unit. The access control unit may be operable to process the session request based on the TCP state and according to the predetermined policy.

According to another approach of the present disclosure, there is provided a method for a TCP state handoff of a data traffic flow. The method may commence with determining a TCP state at predetermined times by a state machine unit. The TCP state may include data concerning a session between a client and a server. The method may continue with storing the TCP state for the predetermined times to a database. The method may further include receiving, by a transaction processing unit, a request to apply a predetermined policy to the session. Based on the request, the transaction processing unit may send a session request associated with the session between the client and the server to the access control unit. The session request may be processed based on the TCP state and according to the predetermined policy.

In further example embodiments of the present disclosure, the method operations are stored on a machine-readable medium comprising instructions, which when implemented by one or more processors perform the recited operations. In yet further example embodiments, hardware systems, or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
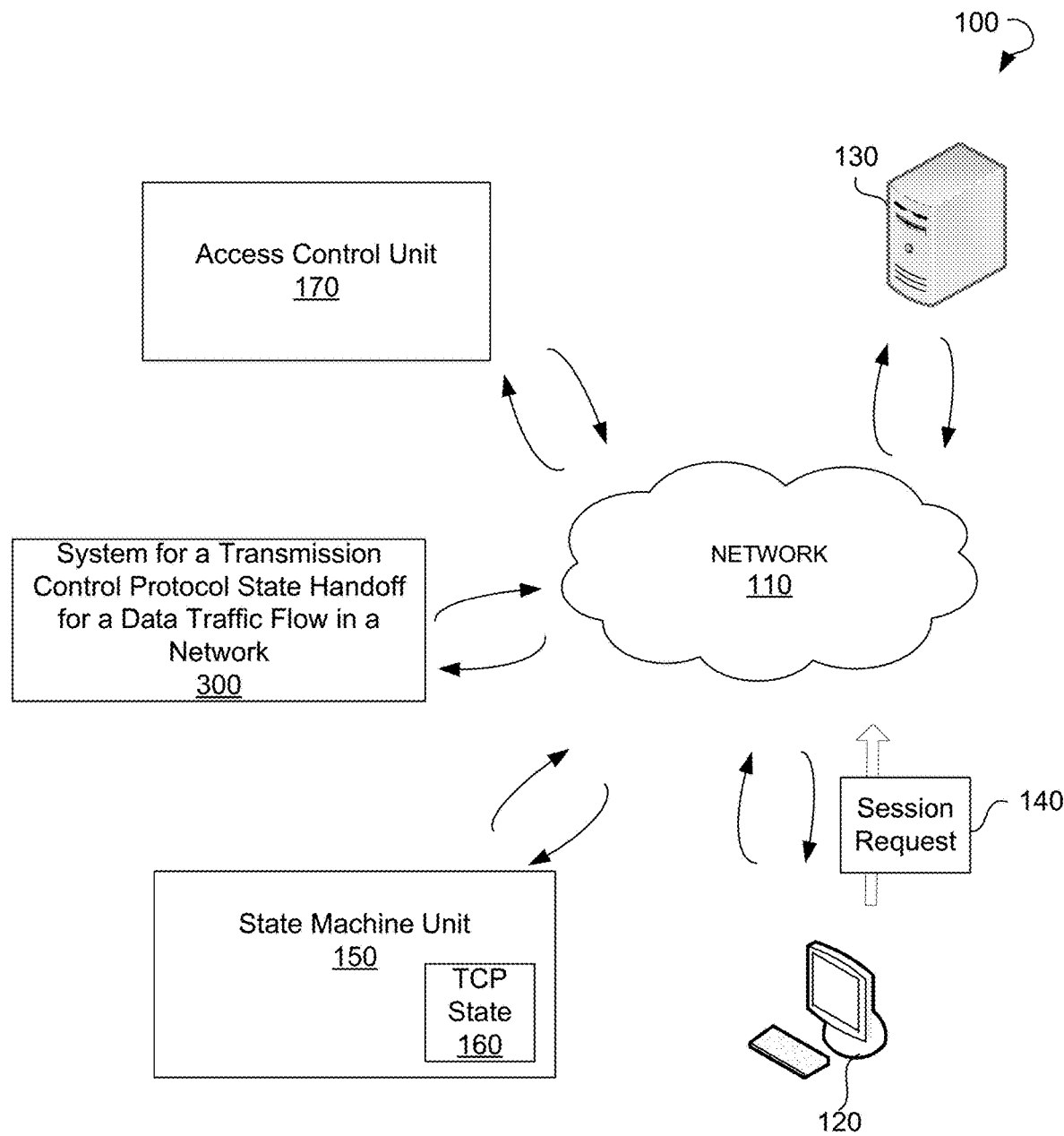
FIG. 1 shows an environment, within which methods and systems for a TCP state handoff of a data traffic flow can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

Embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

As outlined in the summary, the embodiments of the present disclosure are directed to a TCP state handoff of a data traffic flow. A connection between two TCP devices (e.g. between a client and a server) can begin in a null state with no connections present. A connection process can go through a series of states to establish a connection between two TCP devices. Upon occurrence of an event causing the connection to be closed, the connection may return to a closed state. States of the connection between the client and the server can also be referred to as TCP states.

A TCP state handoff is a process of migration of an established TCP state from an original node to a new node. During the TCP state handoff, one TCP socket endpoint can seamlessly migrate from one node to the other node. After such TCP state handoff, the new node may send data packets directly to the other TCP endpoint. Content-aware request distribution among servers performed using the TCP state handoff may enable intelligent distribution of data packets, provide quality of service requirements for different types of contents, and improve overall cluster performance.

Methods and systems for a TCP state handoff of a data traffic flow of the present disclosure are directed to transferring the TCP state to any node in a network that may need to be brought up into a session between the client and the server. The purpose of bringing up a new node may include providing a secure communication, speeding up a session between the client and the server, and so forth.

More specifically, there may exist a session, such as a HyperText Transfer Protocol (HTTP) transaction, between the client and the server, and a network system (for example, a security system) may determine that scrutiny needs to be applied to the session. In this case, conventional methods require sending a reset command and then setting up a data traffic flow after the resetting, or dropping some packets so that the data traffic flow may be re-established. However, such conventional methods may cause adverse effects on the network performance.

According to the methods and system of the present disclosure, security functions may be performed by an access control unit. In some example embodiments, the access control unit may include a web application firewall. The web application firewall may be operable to filter access to the server (for example, to a web application associated with the server) for the client by inspecting both the data traffic flowing towards the server and the response data traffic flowing from the server. A transaction processing unit may be responsible for processing transactions between the clients and the server. The transaction processing unit may determine that a session needs to be processed by the access control unit for security purposes. The transaction processing unit may send a signal to the access control unit informing the firewall that there is a session to which security policies need to be applied. The transaction processing unit may further provide the access control unit with information about a current TCP state of the session. For this purpose, the transaction processing unit may send a magic packet containing information concerning a current TCP state of the session. The magic packet can include data packet having a sequence of bytes that can be sent as any network- and transport-layer protocol or can be inserted into data packets of any standard protocols of higher layer, such as User Datagram Protocol or Internetwork Packet Exchange. The access control unit may operate in a stand-by mode and may activate upon receiving the magic packet.

Alternatively, the information about a current TCP state of the session may be stored in a database. The transaction processing unit may provide the access control unit with an entry in the database so that the access control unit can obtain the information about a current TCP state of the session by looking up the database. The access control unit may apply predetermined policies to data packets of the session and re-establish the session based on the TCP state.

Referring now to the drawings, FIG. 1 illustrates an environment 100 within which methods and systems for a TCP state handoff of a data traffic flow can be implemented. The environment 100 may include a network 110, a client 120, a server 130, and a system 300 for a TCP state handoff of a data traffic flow. The client 120 may include a network machine or a network resource that sends a session request 140 to the server 130. The client 120 and the server 130 may communicate with each other using the network 110.

The network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The network 110 may include a network of data processing nodes that are interconnected for the purpose of data communication.

A state machine unit 150 may be tracking a TCP state 160 of a session between the client 120 and the server 130. The system 300 may be operable to review all data packets, such as the session request 140, sent between the client 120 and the server 130. If the system 300 determines that security policies need to be applied to the session request 140, the system forwards the session request 140 to an access control unit 170. The access control unit 170 may process the session request 140 according to the security policies and re-establish the session based on the TCP state.

Figure 2:
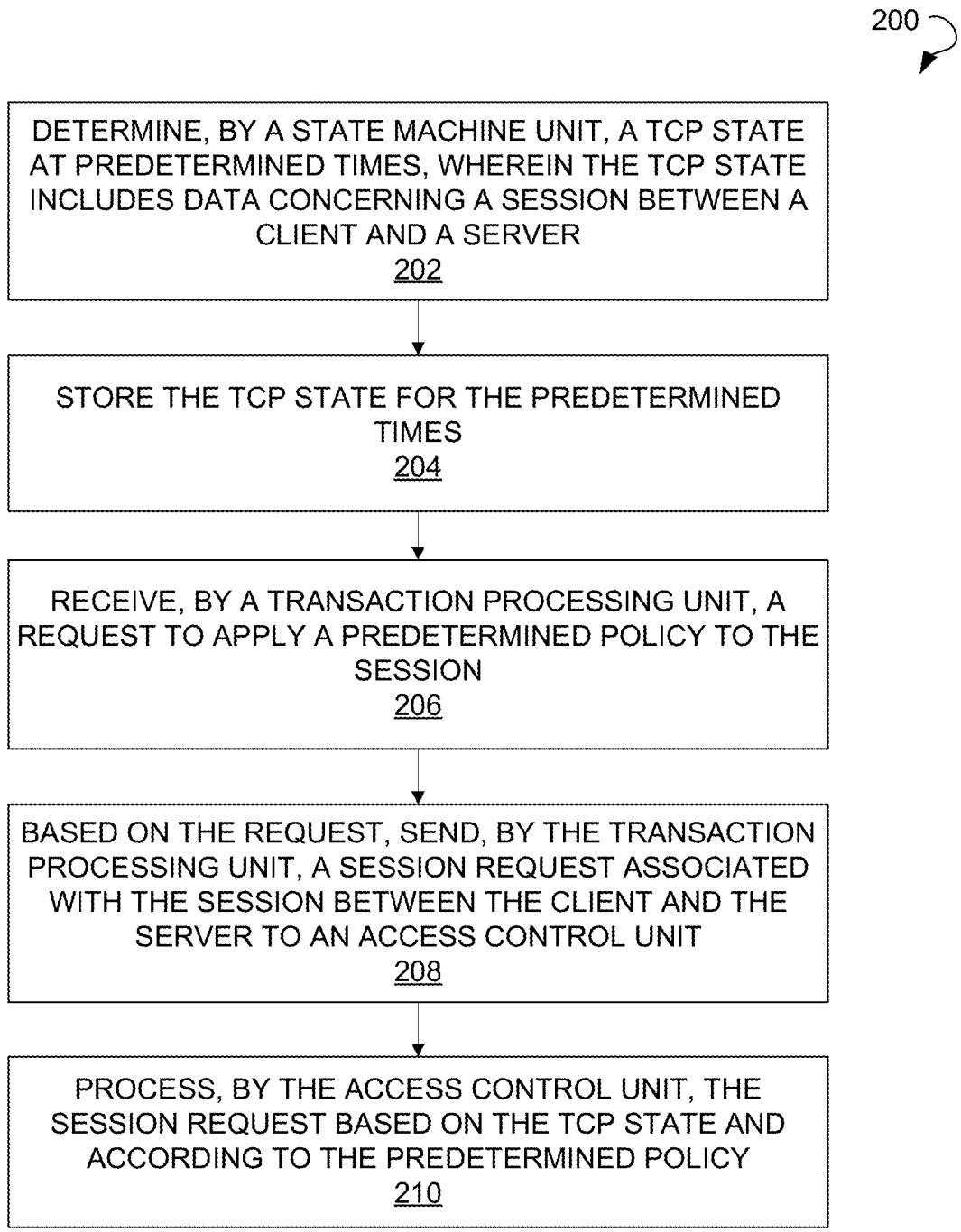
FIG. 2 is a process flow diagram of a method for a TCP state handoff of a data traffic flow.

FIG. 2 shows a process flow diagram of a method 200 for a TCP state handoff of a data traffic flow, according to an example embodiment. In some embodiments, the operations may be combined, performed in parallel, or performed in a different order. The method 200 may also include additional or fewer operations than those illustrated. The method 200 may be performed by processing logic that may comprise hardware (e.g., decision making logic, dedicated logic, programmable logic, and microcode), software (such as software run on a general-purpose computer system or a dedicated machine), or a combination of both.

The method 200 may commence at operation 202 with determining, by a state machine unit, a TCP state for sessions between clients and servers at predetermined times. In example embodiments, the TCP state may include data concerning a session between a client and a server. The data associated with the session may include at least one or more of the following: a source port destination, a current sequence number, a window, a timestamp, a timer, and so forth.

The method 200 may continue with storing the TCP state for a predetermined number of times to a database at operation 204. In example embodiments, the TCP state may be stored to the state machine unit. In further embodiments, a further state machine unit may be initialized. The TCP state may be stored to the further state machine unit.

The method 200 may further include receiving, by a transaction processing unit, a request to apply a predetermined policy to the session at operation 206. In some embodiments, the transaction processing unit may communicate with Distributed Denial of Service (DDoS) units. A DDoS unit may be operable to inspect data traffic flow between the client and the server and notify the transaction processing unit in case predetermined policies (for example, security policies) are needed to be applied to the data traffic flow.

Based on the request, the transaction processing unit may send a session request associated with the session between the client and the server to an access control unit at operation 208. In some embodiments, sending the session request may be delayed by the transaction processing unit until the state machine unit determines the TCP state.

In further embodiments, the storing of the TCP state may include encoding the TCP state into a signal, such as an in-band signal and/or out-of-band signal. The signal may be sent to the access control unit.

In some embodiments, the session request may be sent to the access control unit using a magic packet. The magic packet may include the TCP state and instructions on how to process the session according to the predetermined policy. Upon receiving the magic packet, the access control unit may be activated (for example, switched from a stand-by mode to an active mode).

At operation 210, the method 200 may include processing, by the access control unit, the session request based on the TCP state and according to the predetermined policy. The predetermined policy may include one or more of the following: a security policy, a forwarding policy, and so forth.

In some embodiments, the processing includes sending a reset request to the client. The reset request may prompt the client to resend the session request. Based on the session request resent by the client, the session between the client and the server may be established.

In an example embodiment, the processing of the session request may include establishing a further session between the client and the server. The further session may be established based on the TCP state retrieved by the access control unit from the database.

Figure 3:
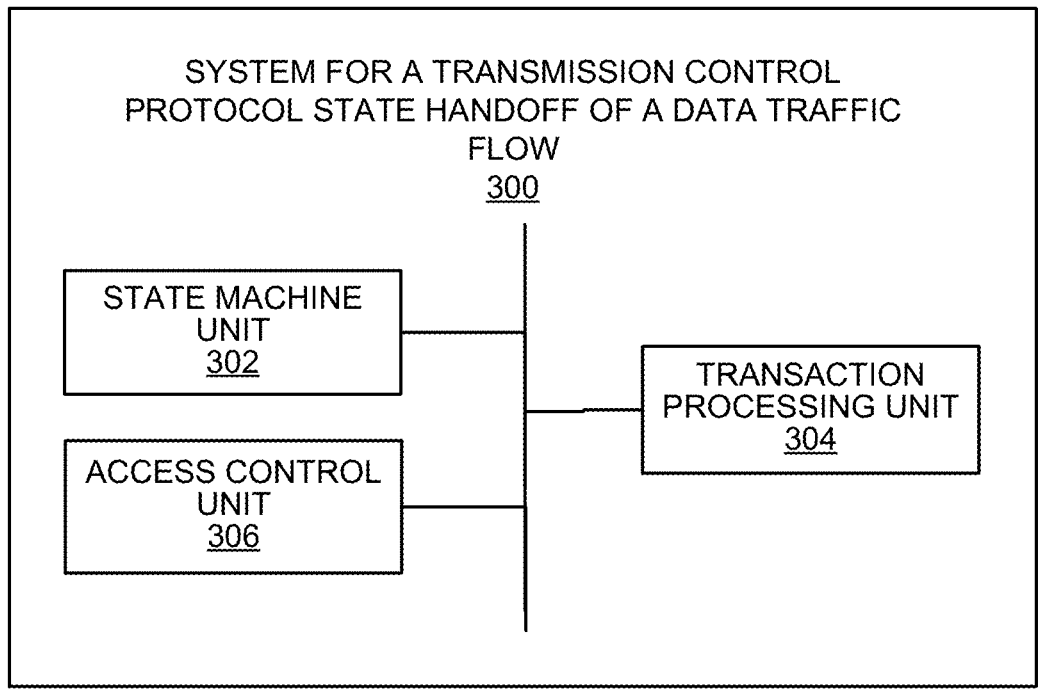
FIG. 3 is a block diagram illustrating a system for a TCP state handoff of a data traffic flow.

FIG. 3 shows a block diagram illustrating various modules of an example system 300 for a TCP state handoff of a data traffic flow. Specifically, the system 300 may include a state machine unit 302, a transaction processing unit 304, and an access control unit 306.

The state machine unit 302 may be operable to determine a TCP state at predetermined times. The TCP state may include data concerning a session between a client and a server. The data concerning the session may include at least one or more of the following: a source port destination, a current sequence number, a window, a timestamp, and a timer.

The transaction processing unit 304 may be operable to store the TCP state for the predetermined times to a database. In some embodiments, the TCP state may be stored to the state machine unit 302. In further embodiments, the storing of the TCP state may include initializing a further state machine unit and storing the TCP state to the further state machine unit.

Alternatively, the storing of the TCP state may include encoding the TCP state into a signal and sending the signal to the access control unit 306.

The transaction processing unit 304 may be further operable to receive a request to apply a predetermined policy to the session. Based on the request, the transaction processing unit 304 may send a session request associated with the session between the client and the server to the access control unit 306.

In some embodiments, the session request may be sent to the access control unit using a magic packet. The magic packet may include the TCP state and instructions to process the session according to the predetermined policy.

The access control unit 306 may be operable to process the session request based on the TCP state and according to the predetermined policy. In some embodiments, the processing of the session request by the access control unit 306 may include establishing a further session between the client and the server. The further session may be established based on the TCP state retrieved by the access control unit 306.

In further example embodiments, the processing may include the access control unit 306 sending a reset request to the client. The reset request may prompt the client to resend the session request. Upon receiving the session request resent by the client, a session between a client and a server may be established.

Figure 4:
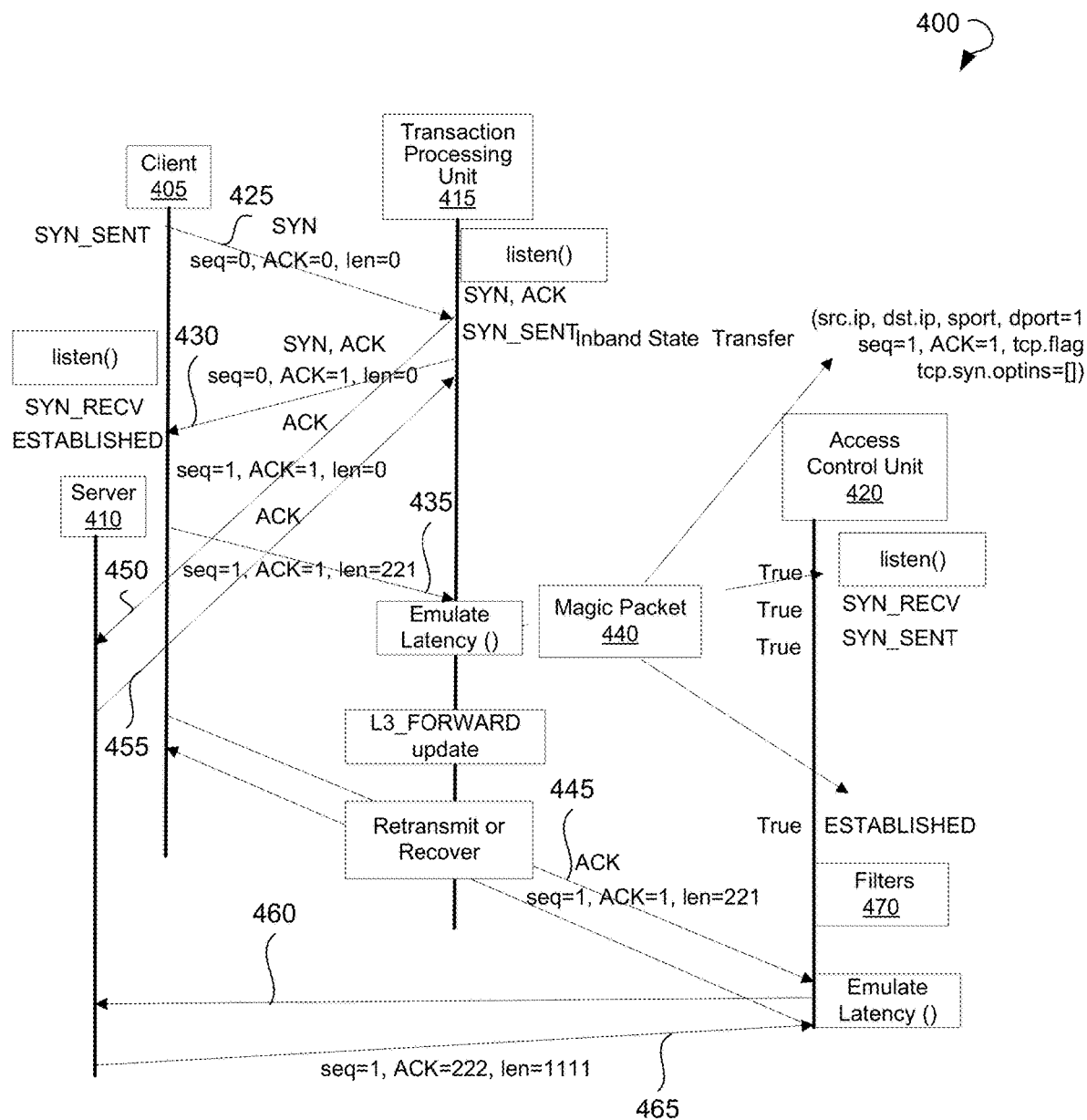
FIG. 4 is a schematic diagram showing a TCP state handoff for a data packet flow between a client and a server.

FIG. 4 is a schematic diagram 400 showing a TCP state handoff for a data packet flow between a client and a server, according to an example embodiment. FIG. 4 shows an embodiment when there is an established session between a client 405 and a server 410. A transaction processing unit 415 may determine that a predetermined policy that requires a data traffic flow associated with the session is to be sent to an access control unit 420.

The client 405 may send a "SYNchronize" message 425 to the transaction processing unit 415. The transaction processing unit 415 receives the "SYNchronize" message 425 from the client 405 and sends a "SYNchronize-ACKnowledgement" message 430 to the client 405. The client 405 receives the "SYNchronize-ACKnowledgement" message 430 from the transaction processing unit 415 and sends an "ACKnowledgement" message 435 to the transaction processing unit 415.

Additionally, the transaction processing unit 415 may send an "ACKnowledgement" message 450 to the server 410. In turn, the server 410 may send an "ACKnowledgement" message 455 to the transaction processing unit 415. Furthermore, an access control unit 420 may exchange messages 460, 465 with the server 410.

Upon receiving the "SYNchronize-ACKnowledgement" message 430, the transaction processing unit 415 may emulate latency and send a magic packet 440 to the access control unit 420. The latency may correspond to a time needed by a state machine unit (not shown) to establish the TCP state of the session established between the client 405 and the server 410. Therefore, data packets of the data traffic flow may be queued until a delay time (latency) is reached and then sent to a destination point.

The magic packet 440 may contain data about a current TCP state between the client 405 and the server 410. Alternatively, the magic packet 440 may contain a reference to a database, in which data about the TCP state between the client 405 and the server 410 are stored.

Upon receiving the magic packet 440, the access control unit 420 may apply predetermined policies to the data traffic associated with the session (for example, apply filters 470) and re-establish the session based on the TCP state. Additionally, the access control unit 420 may instruct the client 405 to retransmit or recover a session request if a timer of the session is not expired, and the client 405 may send an "ACKnowledgement" message 445 to the access control unit 420.

Therefore, the access control unit 420 may act as a TCP proxy between the client 405 and the server 410. More specifically, from a perspective from the access control unit 420 to the server 410, the access control unit 420 may act as a client. From a perspective from the access control unit 420 to the client 405, the access control unit 420 may act as a server. The access control unit 420 may apply predetermined policies to the data traffic flow between the client 405 and the server 410 to provide a secure communication. Additionally, the access control unit 420 may process the data traffic flow using cryptography, such as elliptical curve cryptography, and the like.

If the client 405 sends a further session (not shown) to the server 410, there is no need to perform the TCP state handoff because the access control unit 420 already has a flow mapping for the client 405 and the server 410.

Figure 5:
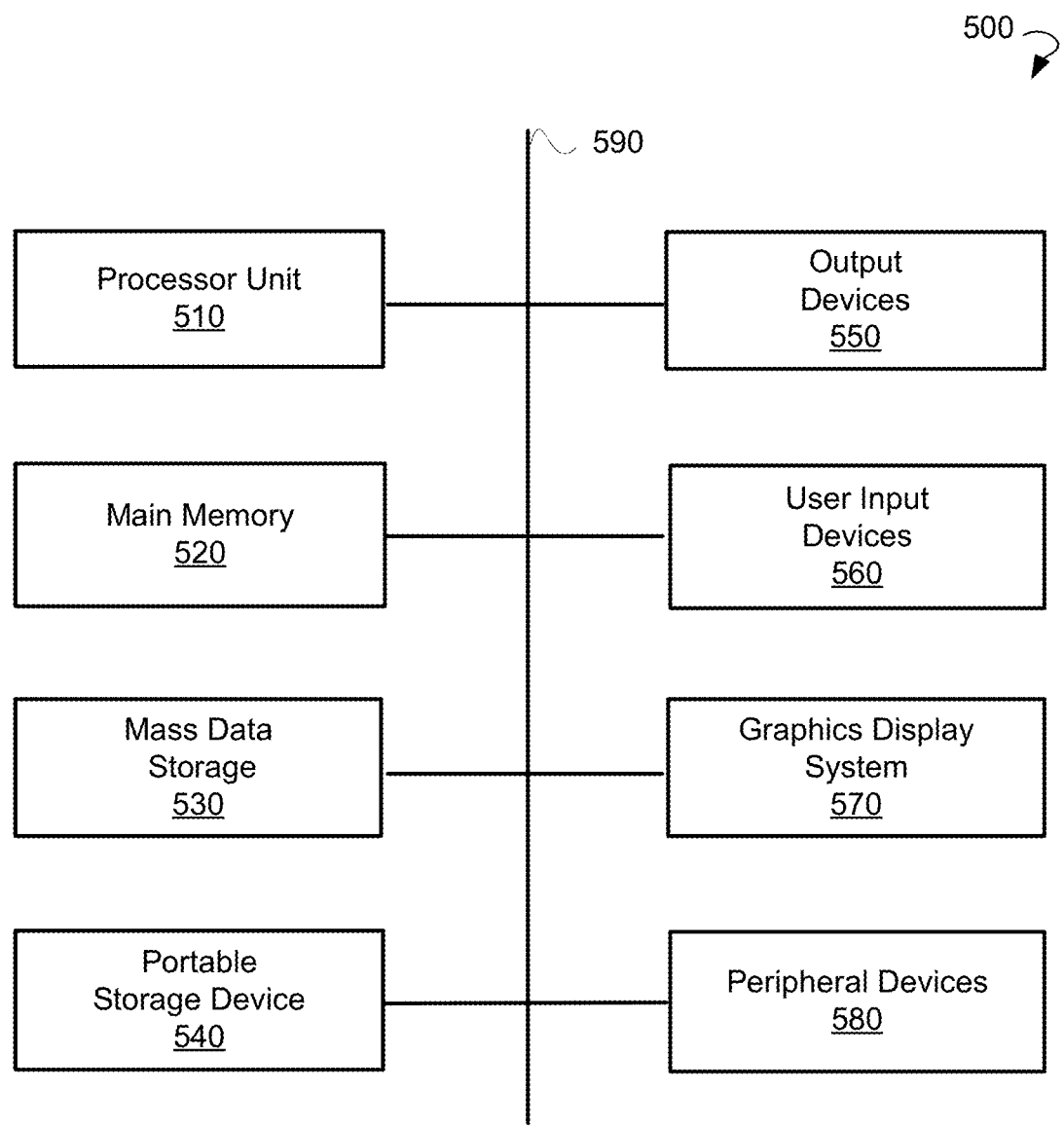
FIG. 5 shows a diagrammatic representation of a computing device for a machine, within which a set of instructions for causing the machine to perform any one or more of the methodologies discussed herein can be executed.

FIG. 5 illustrates an example computer system 500 that may be used to implement embodiments of the present disclosure. The computer system 500 may serve as a computing device for a machine, within which a set of instructions for causing the machine to perform any one or more of the methodologies discussed herein can be executed. The computer system 500 can be implemented in the contexts of the likes of computing systems, networks, servers, or combinations thereof. The computer system 500 includes one or more processor units 510 and main memory 520. Main memory 520 stores, in part, instructions and data for execution by processor 510. Main memory 520 stores the executable code when in operation. The computer system 500 further includes a mass data storage 530, portable storage device(s) 540, output devices 550, user input devices 560, a graphics display system 570, and peripheral devices 580. The methods may be implemented in software that is cloud-based.

The components shown in FIG. 5 are depicted as being connected via a single bus 590. The components may be connected through one or more data transport means. Processor unit 510 and main memory 520 are connected via a local microprocessor bus, and mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit 510. Mass data storage 530 stores the system software for implementing embodiments of the present disclosure for purposes of loading that software into main memory 520.

Portable storage device 540 operates in conjunction with a portable non-volatile storage medium, such as a floppy disk, CD, DVD, or USB storage device, to input and output data and code to and from the computer system 500. The system software for implementing embodiments of the present disclosure is stored on such a portable medium and input to the computer system 500 via the portable storage device 540.

User input devices 560 provide a portion of a user interface. User input devices 560 include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 includes output devices 550. Suitable output devices include speakers, printers, network interfaces, and monitors.

Graphics display system 570 includes a liquid crystal display or other suitable display device. Graphics display system 570 receives textual and graphical information and processes the information for output to the display device. Peripheral devices 580 may include any type of computer support device to add additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for a TCP state handoff of a data traffic flow have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for a Transmission Control Protocol (TCP) state handoff of a data traffic flow, the system comprising:
a hardware state machine unit operable to:
determine a TCP state at predetermined times, wherein the TCP state includes data concerning a session between a client and a server;
a hardware transaction processing unit operable to:
receive a request to apply a predetermined policy to the session, the session being processed by the hardware transaction processing unit, wherein the applying the predetermined policy includes transferring the processing of the session to a hardware access control unit; and
based on the request, transferring the processing of the session from the hardware transaction processing unit to the hardware access control unit by sending a session request associated with the session between the client and the server to the hardware access control unit; and
the hardware access control unit operable to:
based on the session request, process the session based on the TCP state, the processing including:
re-establishing, by the hardware access control unit, the session between the client and the server based on the TCP state, the hardware access control unit acting exclusively as a proxy between the client and the server in the session;
communicating data packets associated with the session by:
receiving, by the hardware access control unit, a first portion of the data packets directly from the client and sending, by the hardware access control unit, the first portion of the data packets directly to the server; and
receiving, by the hardware access control unit, a second portion of the data packets directly from the server and sending, by the hardware access control unit, the second portion of the data packets directly to the client; and
applying the predetermined policy to the data packets associated with the session.

2. The system of claim 1, wherein the processing of the session further includes establishing a further session between the client and the server, the further session being established based on the TCP state retrieved by the hardware access control unit.

3. The system of claim 1, wherein the hardware state machine unit is further configured to store the TCP state for the predetermined times to at least one of the hardware state machine unit and a database.

4. The system of claim 3, wherein the storing of the TCP state includes:
initializing a further state machine unit; and
storing the TCP state to the further state machine unit.

5. The system of claim 3, wherein the storing of the TCP state includes:
encoding the TCP state into a signal; and
sending the signal to the hardware access control unit.

6. The system of claim 1, wherein the processing includes sending a reset request to the client, the reset request prompting the client to resend the session request.

7. The system of claim 1, wherein the session request is sent to the hardware access control unit using a magic packet, the magic packet including the TCP state and an instruction to process the session according to the predetermined policy.

8. The system of claim 1, wherein the data concerning the session include at least one or more of the following: a source port destination, a current sequence number, a window, a timestamp, and a timer.

9. The system of claim 1, wherein the hardware transaction processing unit is further operable to delay the sending of the session request until the hardware state machine unit determines the TCP state.

10. A method for a Transmission Control Protocol (TCP) state handoff of a data traffic flow, the method comprising:
determining, by a state machine unit, a TCP state at predetermined times, wherein the TCP state includes data concerning a session between a client and a server;
receiving, by a transaction processing unit, a request to apply a predetermined policy to the session, the session being processed by the transaction processing unit, wherein the applying the predetermined policy includes transferring the processing of the session to an access control unit;
based on the request, transferring the processing of the session from the transaction processing unit to the access control unit by sending, by the transaction processing unit, a session request associated with the session between the client and the server to the access control unit; and
based on the session request, processing, by the access control unit, the session based on the TCP state, the processing including:
re-establishing, by the access control unit, the session between the client and the server based on the TCP state, the access control unit acting exclusively as a proxy between the client and the server in the session;
communicating data packets associated with the session by:
receiving, by the access control unit, a first portion of the data packets directly from the client and sending, by the access control unit, the first portion of the data packets directly to the server; and
receiving, by the access control unit, a second portion of the data packets directly from the server and sending, by the access control unit, the second portion of the data packets directly to the client; and
applying the predetermined policy to the data packets associated with the session.

11. The method of claim 10, wherein the processing of the session further includes establishing a further session between the client and the server, the further session being established based on the TCP state retrieved by the access control unit.

12. The method of claim 10, further comprising storing the TCP state for the predetermined times to at least one of the state machine unit and a database.

13. The method of claim 12, wherein the storing of the TCP state further includes:
initializing a further state machine unit; and
storing the TCP state to the further state machine unit.

14. The method of claim 12, wherein the storing of the TCP state includes:
encoding the TCP state into a signal; and
sending the signal to the access control unit.

15. The method of claim 10, wherein the processing includes sending a reset request to the client, the reset request prompting the client to resend the session request.

16. The method of claim 10, wherein the session request is sent to the access control unit using a magic packet, the magic packet including the TCP state and an instruction to process the session according to the predetermined policy.

17. The method of claim 10, wherein the data concerning the session include at least one or more of the following: a source port destination, a current sequence number, a window, a timestamp, and a timer.

18. The method of claim 10, wherein the predetermined policy includes one or more of the following: a security policy and a forwarding policy.

19. The method of claim 10, further comprising delaying, by the transaction processing unit, sending the session request until the state machine unit determines the TCP state.

20. A system for a Transmission Control Protocol (TCP) state handoff of a data traffic flow, the system comprising:
a hardware state machine unit operable to:
determine a TCP state at predetermined times, wherein the TCP state includes data concerning a session between a client and a server;
a hardware transaction processing unit operable to:
receive a request to apply a predetermined policy to the session, the session being processed by the hardware transaction processing unit, wherein the applying the predetermined policy includes transferring the processing of the session to a hardware access control unit; and
based on the request, transferring the processing of the session from the hardware transaction processing unit to the hardware access control unit by sending a session request associated with the session between the client and the server to the hardware access control unit, wherein the session request is sent to the hardware access control unit using a magic packet, the magic packet including the TCP state and an instruction to process the session according to the predetermined policy; and
the hardware access control unit operable to:
based on the session request, process the session based on the TCP state, wherein the processing of the session includes:
re-establishing, by the hardware access control unit, the session between the client and the server based on the TCP state, the TCP state being retrieved by the hardware access control unit from the magic packet, the hardware access control unit acting exclusively as a proxy between the client and the server in the session;
communicating data packets associated with the session by:
receiving, by the hardware access control unit, a first portion of the data packets directly from the client and sending, by the hardware access control unit, the first portion of the data packets directly to the server; and
receiving, by the hardware access control unit, a second portion of the data packets directly from the server and sending, by the hardware access control unit, the second portion of the data packets directly to the client; and
applying the predetermined policy to the data packets associated with the session.

* * * * *